L. M. WOOD.
PROCESS OF STERILIZING LIQUIDS.
APPLICATION FILED DEC. 19, 1917.
1,278,278.
Patented Sept. 10, 1918.
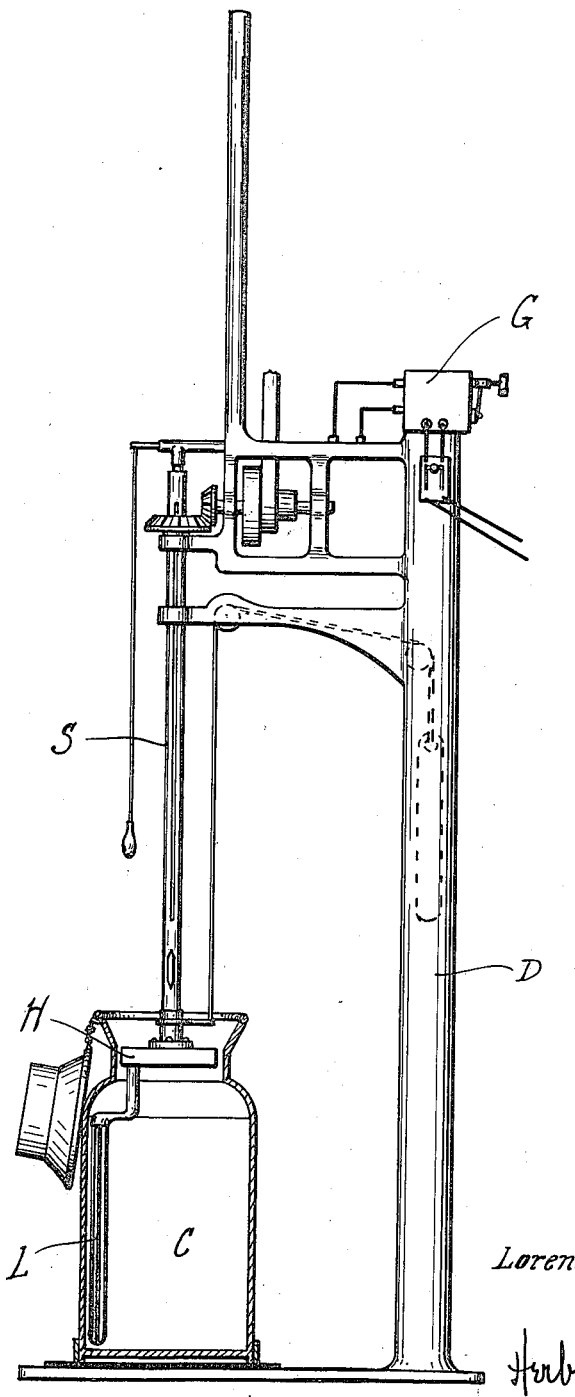
Inventor
Lorena M. Wood.
Herbert E. Smith
Attorney

UNITED STATES PATENT OFFICE.

LORENA M. WOOD, OF SPOKANE, WASHINGTON, ASSIGNOR OF ONE-HALF TO JOSEPH R. GUMM, OF KELSO, WASHINGTON.

PROCESS OF STERILIZING LIQUIDS.

1,278,278.   Specification of Letters Patent.   Patented Sept. 10, 1918.

Application filed December 19, 1917.   Serial No. 207,968.

*To all whom it may concern:*

Be it known that I, LORENA M. WOOD, a citizen of the United States, residing at Spokane, in the county of Spokane and State of Washington, have invented certain new and useful Improvements in Processes of Sterilizing Liquids, of which the following is a specification.

The present invention relates to an improved process of sterilizing liquids, and more particularly for destroying the bacteria and germs in milk or lacteal fluid by the emission of ultraviolet rays from an electric lamp and the trnsmission of said rays through the liquid to be sterilized.

Preferably the rays are of the high frequency type and the lamp is brought into direct contact with milk by imparting to the lamp a peculiar movement the apparatus for which is involved in a co-pending application filed simultaneously with the present application for the process.

The primary object of the invention is to evolve a method or process by which the milk may be sterilized while in the usual receptacle or milk can, and in which the sterilization and purification of the milk may be accomplished in a thorough and complete manner, thus rendering the milk ready for distribution and use while still in the receptacle in which the sterilization has taken place.

In the utilization of this process the milk is held in a retainer or can and is exposed to the action of the ultraviolet rays which pass from the electrode or lamp through the milk and the walls of the container, and thence back to the generator.

In order to illustrate the process or method of treating the milk I have utilized a diagrammatic drawing, which depicts, in conventional form, the apparatus, or so much thereof as is necessary to understand the process, which forms part of the co-pending patent application hereinbefore referred to. The milk to be sterilized is held in the container or can C, and the milk in the can is stirred and agitated during the process by a mechanically actuated rotary lamp L, the lamp being carried by a housing H which is itself revolved through the instrumentality of a spindle S. The lamp L is preferably a glass tube filled with gas and receives current from the generator G on the standard D, and it will be understood that the lamp emits ultraviolet rays as it revolves about its own center, and is bodily revolved about the center of rotation of the housing. Thus it will be obvious that the milk is stirred or agitated as the lamp traverses, through a series of circular loops, a circular pathway, the loops being of a diameter approximately equal to the radius of the can, and the milk is exposed at all places to the action of the rays as they are emitted from the lamp, and by this close contact with every particle of the milk, the bacteria or germs are thoroughly and completely destroyed.

It has been determined that different forms of bacteria are present in milk, and to destroy these different forms of impurities or germs, it is necessary to a thorough sterilization of the milk, that particular electric currents be adapted for particular forms of bacteria in order to destroy the bacteria. Therefore in the treatment of milk according to the present process the frequency of vibration of the electric current is varied, as from a high frequency to a low frequency and vice versa, in order that all forms of bacteria may be affected and effectually destroyed by the ultraviolet rays that are peculiarly adapted for sterilizing the milk.

While milk has been referred to hereinbefore as the liquid to be sterilized, it will be apparent that the same process may be utilized in the treatment of impure and stagnant water and the ozone generated from the lamp rays is a factor in sterilizing the water, as also in the treatment of milk. The ozone is a strong disinfectant, and is thus effective in purifying the liquids.

In treating milk according to this process it has been found that a thorough elimination of bacteria has been accomplished and that by reason thereof the milk has been maintained in sweet condition for longer periods of time than the untreated milk, and the treatment is especially valuable in thus preventing contamination or souring of the milk.

What is claimed herein is:—

1. The process of sterilizing liquids while in a container which consists in subjecting the liquid in mass to the action of ultraviolet rays from an immersed electric lamp and simultaneously agitating the liquid in order that the rays may reach all particles of the liquid.

2. The process of sterilizing liquids which consists in subjecting the liquid to the action of ultraviolet rays of various degrees of high and lower frequency from an electric lamp, and moving the lamp throughout the area of the liquid to reach all particles therein.

In testimony whereof I affix my signature.

LORENA M. WOOD.